(12) United States Patent
Kim

(10) Patent No.: US 11,779,868 B2
(45) Date of Patent: Oct. 10, 2023

(54) EM FILTER FOR EGR COOLER

(71) Applicants: Hyundai Motor Company, Seoul (KR); Kia Motors Corporation, Seoul (KR)

(72) Inventor: Jongcheon Kim, Bucheon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 265 days.

(21) Appl. No.: 17/071,465

(22) Filed: Oct. 15, 2020

(65) Prior Publication Data
US 2021/0370207 A1   Dec. 2, 2021

(30) Foreign Application Priority Data
May 27, 2020  (KR) .......................... 10-2020-0063555

(51) Int. Cl.
*B01D 39/10* (2006.01)
*F02M 26/35* (2016.01)
(Continued)

(52) U.S. Cl.
CPC ......... *B01D 39/10* (2013.01); *B01D 46/0001* (2013.01); *B01D 46/0002* (2013.01); *F02M 26/29* (2016.02); *F02M 26/35* (2016.02); *B01D 2239/0613* (2013.01); *B01D 2239/10* (2013.01); *B01D 2239/1216* (2013.01);
(Continued)

(58) Field of Classification Search
CPC .... B01D 39/10; B01D 39/12; B01D 46/0001; B01D 46/0002; B01D 2239/0613; B01D 2239/10; B01D 2239/1216; B01D 2239/1233; B01D 2271/02; B01D 2279/30; B01D 29/0093; F02M 26/15; F02M 26/22; F02M 26/29; F02M 26/35; D03D 15/0004; D03D 15/25; D03D 15/67; B21D 47/00;
(Continued)

(56) References Cited

U.S. PATENT DOCUMENTS

| 1,294,486 | A | * | 2/1919 | Kuen | ........................ | F21V 7/24 |
| | | | | | | 29/445 |
| 2001/0020780 | A1 | * | 9/2001 | Kato | ........................ | D03D 1/02 |
| | | | | | | 280/743.1 |

(Continued)

FOREIGN PATENT DOCUMENTS

| DE | 102005061250 A1 | * | 6/2007 | ........... D03D 1/0082 |
| DE | 102013221508 A1 | * | 4/2014 | ............. F02M 26/06 |

(Continued)

OTHER PUBLICATIONS

DE102013221508A1_ENG (Espacenet machine translation of Takasawa) (Year: 2014).*

(Continued)

*Primary Examiner* — Gabriel E Gitman
(74) *Attorney, Agent, or Firm* — Slater Matsil, LLP

(57) ABSTRACT

An EM filter for an EGR cooler includes a gasket and a mesh filter including a horizontal wire and a vertical wire that are metal wires, wherein the horizontal wire and the vertical wire form a twill weave structure, and wherein a wire diameter of the horizontal wire with respect to a wire diameter of the vertical wire is greater than 1 and less than or equal to 1.3.

20 Claims, 6 Drawing Sheets

(51) Int. Cl.
  *F02M 26/29*    (2016.01)
  *B01D 46/00*    (2022.01)
  *B21D 22/02*    (2006.01)
(52) U.S. Cl.
  CPC .. *B01D 2239/1233* (2013.01); *B01D 2271/02* (2013.01); *B01D 2279/30* (2013.01); *B21D 22/02* (2013.01)
(58) Field of Classification Search
  CPC ......... B21D 47/005; B07B 1/46; B21F 27/02; B21F 27/18
  See application file for complete search history.

(56) References Cited

U.S. PATENT DOCUMENTS

| | | | |
|---|---|---|---|
| 2009/0071151 A1* | 3/2009 | Rolle | B01D 39/2093 60/311 |
| 2011/0173956 A1* | 7/2011 | Kotthoff | B01D 46/2411 60/278 |
| 2013/0247547 A1* | 9/2013 | Sittig | B01D 46/521 60/311 |
| 2018/0328490 A1* | 11/2018 | Claus | F16J 15/064 |
| 2019/0264640 A1 | 8/2019 | Lutz et al. | |
| 2019/0383244 A1 | 12/2019 | Kim | |

FOREIGN PATENT DOCUMENTS

| | | | | |
|---|---|---|---|---|
| EP | 2369147 A1 | * | 9/2011 | ......... F01N 13/1827 |
| JP | 2003097253 A | * | 4/2003 | |
| JP | 2369147 A1 | * | 9/2011 | ......... F01N 13/1827 |
| KR | 20170119843 A | | 10/2017 | |
| KR | 20190034619 A | | 4/2019 | |
| KR | 20190141960 A | | 12/2019 | |

OTHER PUBLICATIONS

JP2003097253A_ENG (Google Patents translation of Sonomoto) (Year: 2003).*
DE102005061250A1_ENG (Espacenet machine translation of Edelmeier) (Year: 2007).*

* cited by examiner

EM FILTER FOR EGR COOLER

CROSS-REFERENCE TO RELATED APPLICATIONS

This application claims priority to Korean Patent Application No. 10-2020-0063555, filed on May 27, 2020, which application is hereby incorporated herein by reference.

TECHNICAL FIELD

The present invention relates to an EM filter for an EGR cooler.

BACKGROUND

In a vehicle, exhaust gas burned by an engine is partially recirculated, so that harmful substances contained in the exhaust gas are reduced.

When the exhaust gas is recirculated, a combustion temperature in the engine becomes low, and nitrogen oxides (NOx) contained in the exhaust gas are reduced, which is one of the measures corresponding to exhaust gas regulations.

Generally, an exhaust gas recirculation (EGR) cooler applied to a gasoline engine is a device that improves fuel efficiency and reduces harmful compounds (NOx) by recirculating some of the exhaust gas discharged through an exhaust manifold.

In this case, an EM filter is installed in the EGR cooler to protect a system (catalyst, turbocharger, etc.) from foreign materials in the exhaust gas circulated through the EGR cooler.

Since a conventional EM filter is manufactured in a plain weave structure, clogging occurs in the EM filter due to accumulation of soot, foreign materials, etc. between meshes of the EM filter.

In order to solve this problem, Korean Patent Publication No. 10-2019-0034619 tries to solve clogging caused by soot by improving a filter by a method of using a hot wire (~600° C.), but since costs are increased due to installation of additional devices, there is a problem that productivity may not be secured.

KR 10-2017-0119843 A discloses a technique related to an 'exhaust gas recirculation device'.

The above information disclosed in this Background section is only for enhancement of understanding of the background of the invention, and therefore it may contain information that does not form the prior art that is already known to a person of ordinary skill in the art.

SUMMARY

The present invention relates to an EM filter for an EGR cooler. Particular embodiments relate to an EM filter having a twill weave structure.

Embodiments of the present invention provide an EM filter having a twill weave structure in which a three-dimensional space is secured to prevent clogging due to accumulation of soot in an EM filter of a gasoline EGR cooler.

An embodiment of the present invention provides an EM filter for an EGR cooler, including a gasket and a mesh filter, wherein the mesh filter may include a horizontal wire and a vertical wire that are metal wires, the horizontal wire and the vertical wire may form a twill weave structure, and a wire diameter of the horizontal wire with respect to a wire diameter of the vertical wire may be greater than 1 and 1.3 or less.

The metal wire may be a SUS wire.

The horizontal wire may pass through two or more vertical wires, and then may intersect a next vertical wire.

In the twill weave structure, horizontal wires adjacent to each other may respectively intersect different vertical wires.

The twill weave structure may include pores formed by intersecting of the horizontal wire and the vertical wire, and sizes and shapes of the pores may be substantially the same.

The pore may be square, and a length of one side of the pore may be 130 μm to 200 μm.

A ratio of the horizontal and vertical wires may be 1.1:1 to 1.2:1.

A diameter of the horizontal wire may be 100 μm to 150 μm.

The EM filter may be manufactured by performing processes of preparing horizontal and vertical wires that are metal wires, manufacturing a mesh sheet by twill-weaving the horizontal and vertical wires, manufacturing a hemispherical mesh filter by drawing the manufactured mesh sheet on a hemispherical plate, and assembling the manufactured mesh filter with a gasket.

The EM filter may be manufactured by further performing a process of heat-treating the horizontal and vertical wires before the twill-weaving of the horizontal and vertical wires.

A wire diameter of the horizontal wire with respect to a wire diameter of the vertical wire may be greater than 1 and 1.3 or less.

The EM filter of embodiments of the present invention may reduce or prevent accumulation of soot and foreign materials by including a mesh filter woven with horizontal and vertical wires, which are metal wires having a wire diameter of a predetermined ratio, to have a three-dimensional twill weave structure, thus it is possible to improve fuel efficiency of a vehicle by improving the flow of exhaust gas.

DETAILED DESCRIPTION OF ILLUSTRATIVE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 2:
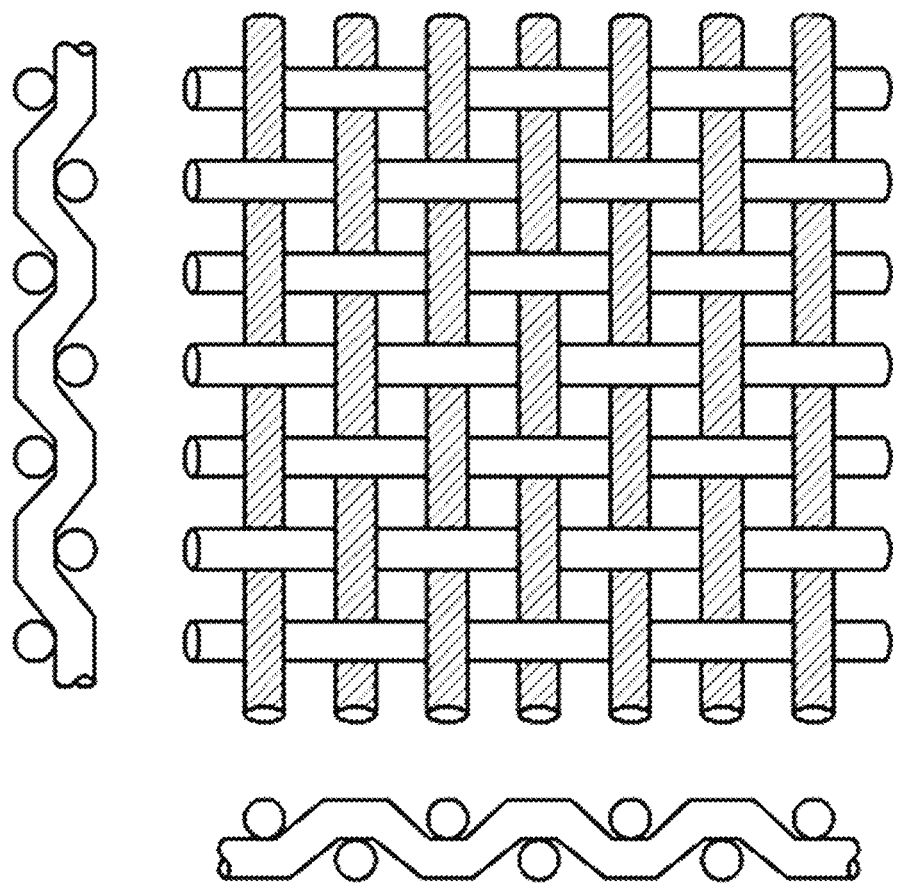
FIG. 2 illustrates a structure of an EM filter having a plain weave structure of the prior art.
Figure 3:
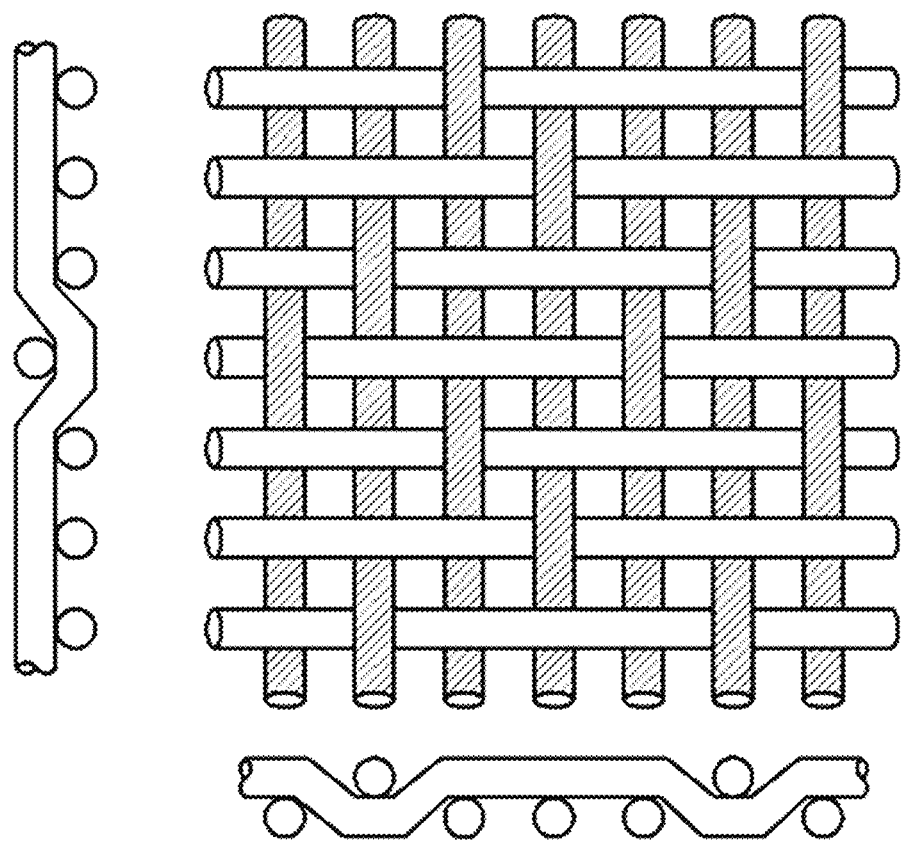
FIG. 3 illustrates a structure of an EM filter according to an embodiment.

In the present specification, "stage" is a unit defining an interval of a mesh, and when a horizontal wire and a vertical wire of the mesh intersect, it indicates an interval between intersections in the same direction. That is, a one-stage means that one intersection in one other direction exists between intersections in the same direction, and a three-stage means that three intersections in other directions exist between intersections in the same direction. For example, as shown in FIG. 2, in a case of a plain weave mesh, since there is one intersection in another direction between intersections in the same direction, a mesh interval thereof is a one-stage, and as shown in FIG. 3, in a case of a twill weave mesh, since there are three intersections in another direction between intersections in the same direction, a mesh interval thereof is a three-stage.

Figure 1:
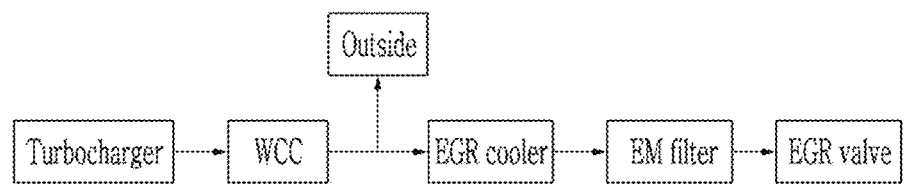
FIG. 1 illustrates a schematic structure of an exhaust system.

A schematic exhaust system of embodiments of the present invention is illustrated in FIG. 1.

Exhaust gas may be introduced into an EGR cooler through a warm-up catalytic converter (WCC) of a turbocharger, or discharged to the outside as it is. The exhaust gas introduced into the EGR cooler is filtered through an EM filter installed between the EGR cooler and an EGR valve, and then introduced into the EGR valve. The exhaust gas introduced into the EGR valve may be recirculated, or discharged to the outside as it is.

The EGR cooler cools the exhaust gas, and the EGR valve serves to control an amount of the exhaust gas. The EM filter is installed between the EGR cooler and the EGR valve to filter foreign materials contained in the exhaust gas.

Two or more EM filters may be installed between the EGR cooler and the EGR valve. In this case, when hot exhaust gas is introduced, the exhaust gas is filtered through an EM filter capable of filtering the hot exhaust gas, and then cooled through the EGR cooler, and it may be again filtered by the EM filter and another EM filter to be introduced into the EGR valve.

The EM filter may include a gasket and a mesh filter.

The gasket serves to protect the mesh filter, that is, to seal it. The gasket may be made of an SUS301H or NBR material.

When the mesh filter is woven by using a metal wire, horizontal and vertical wires are woven in a twill weave. The wire may be a SUS (stainless steel) wire.

The EM filter is woven using a metal wire, and in this case, instead of a plain weave in which horizontal and vertical wires intersect each other, the horizontal and vertical wires are intersected over two or more vertical wires or horizontal wires, respectively, that is, woven in a twill weave of a two-stage or more, thus carbon, soot, and foreign materials are easily separated so that the EM filter is not clogged.

In the twill weave, the mesh interval is a two-stage or more, so a fabric woven in the twill weave has better elasticity than that woven in the plain weave.

In weaving the twill weave structure, the horizontal wire passes through a predetermined number of vertical wires of 2 or more, and then intersects a next vertical wire, and this pattern is repeated, so that the horizontal wire and the vertical wire are woven in the twill weave.

For example, as can be seen in FIG. 3, the horizontal wire passes through three vertical wires, then intersects the next vertical wire, and passes through three vertical wires again, then intersects the next vertical wire, and this process is repeated and thus the twill weave is woven.

Particularly, the horizontal wire intersects a vertical wire that an adjacent horizontal wire does not intersect. That is, in FIG. 3, a first horizontal wire intersects a third vertical wire, a second horizontal wire intersects a fourth vertical wire, a third horizontal wire intersects a second vertical wire, and a fourth horizontal wire intersects a first vertical wire.

As described above, since the horizontal wire and the vertical wire are woven in a twill weave, an effective space thereof is increased more than that of a case woven in a plain weave, which makes it easier to discharge carbon, soot, and foreign materials, thereby preventing clogging of the filter.

Figure 6:
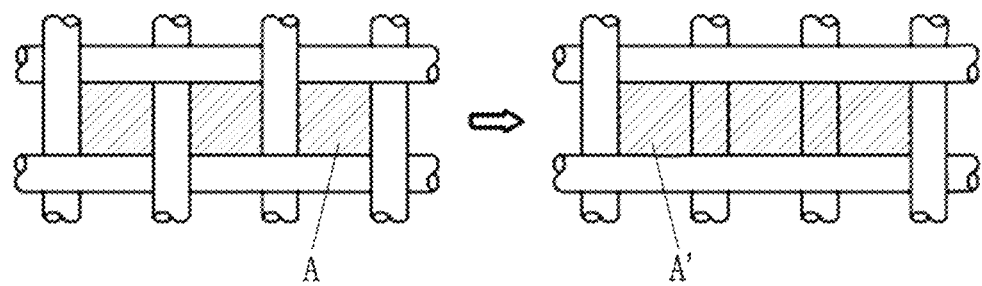
FIG. 6 illustrates effective spaces in cases in which a mesh filter has a plain weave structure and a twill weave structure, respectively.

As shown in FIG. 2, when the horizontal wire and the vertical wire are woven in a plain weave, an area formed by the interval between the horizontal wires adjacent to each other and the interval between the vertical wires adjacent to each other becomes the effective space. Therefore, in FIG. 6, when two horizontal wires and four vertical wires are woven, three spaces having an area of A are formed. Here, an effective space means an opened space between a wire and a wire in an area of a filter.

However, when the horizontal wire and the vertical wire are woven in a twill weave, an area A' formed by a rectangle connecting points at which the horizontal wire and the vertical wire intersect, not the area formed by the horizontal wires or the vertical wires adjacent to each other, is an effective space. Accordingly, when two horizontal wires and four vertical wires are woven, one rectangular area indicated by A' in FIG. 6 becomes an effective space.

Since the area A' of the effective space in the twill weave is larger than the area A of the effective space in the plain weave, and since the area A' of the effective space in the twill weave is larger than a sum 3A of the areas of the effective spaces in the plain weave, filter clogging due to carbon, soot, and foreign materials may be prevented in the mesh filter.

Figure 4:
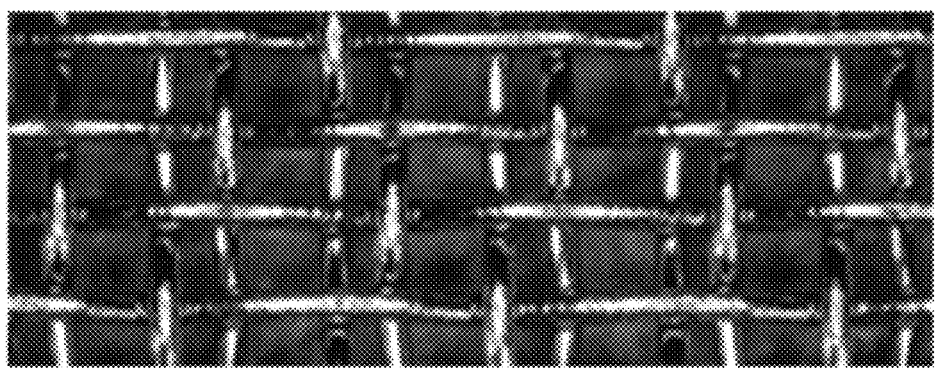
FIG. 4 illustrates a structure of a mesh filter woven to have a three-dimensional twill weave structure using metal wires having a wire diameter ratio of 1:1 of vertical and horizontal wires.

On the other hand, when weaving with a twill weave structure, in order to make a weaving pattern a regular pattern, it is necessary to optimize rigidity by changing a wire diameter of a metal wire. When the rigidity is not optimized, an irregular weaving pattern may be formed as shown in FIG. 4. For example, in the case of a three-stage twill weave mesh of FIG. 4, spaces formed by intersecting of the horizontal wire and the vertical wire are irregular because stress between the horizontal and vertical metal wires during weaving is unbalanced.

As a result of repeated research, the present inventors found that when the wire diameter of the horizontal wire of a three-dimensional twill weave structure to the wire diameter of the vertical wire thereof exceeded 1 and was 1.3 or less, the woven pattern was regularly formed.

For example, a wire diameter ratio of the horizontal wire and the vertical wire may be 1.1:1 to 1.3:4 for example, 1.2:1, but is not limited thereto.

In addition, the wire diameter of the horizontal wire may be about 100 μm to about 150 μm, and the wire diameter of the vertical wire may be selected in an appropriate range by selecting the wire diameter of the horizontal wire in a predetermined range based on the ratio of the wire diameters of the horizontal and vertical wires.

Figure 5:
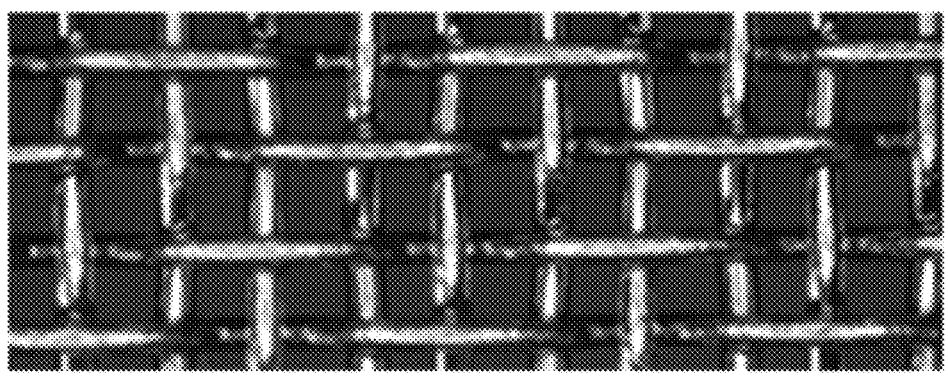
FIG. 5 illustrates a structure of a mesh filter woven to have a three-dimensional twill weave structure using metal wires having a wire diameter ratio of 1.2:1 of vertical and horizontal wires.

When the wire diameters and the ratio of the horizontal wire and the vertical wire are adjusted in an appropriate range, rigidity is optimized, and thus the weaving pattern becomes regular. A three-stage twill weave mesh with a regular weaving pattern is shown in FIG. 5. Comparing FIG. 5 to FIG. 4, the three-stage twill weave mesh of FIG. 5 having a wire diameter ratio of the horizontal wire and the vertical wire of 1.2:1 has a more regular weaving pattern and a larger effective space area than the three-stage twill weave mesh of FIG. 4 having a wire diameter ratio of the horizontal wire and the vertical wire of 1:1.

The regular weaving pattern may be square, and a length of one side of the square may be about 130 μm or more and less than about 200 μm. For example, the length of one side may be about 150 μm or more and about 180 μm or less, and for example, the length of one side may be about 150 μm. As described above, when the weaving pattern of the twill weave structure is uniform, since the effective space is wider than when the weaving pattern thereof is non-uniform, carbon, soot, and foreign materials are more easily discharged.

Hereinafter, a manufacturing method of the EM filter will be described. First, a horizontal wire and a vertical wire made of metal wire are prepared. A commercially available metal wire may be used as the metal wire, or the metal wire may be produced by drawing a metal material. The metal wire may be a SUS wire. Then, after heat-treating the metal wire, the metal wire is subject to a twill weave to manufacture a mesh sheet. The mesh sheet has a three-dimensional twill weave structure, and a wire diameter of the horizontal wire to a wire diameter of the vertical wire may be greater than 1 and 1.3 or less.

Thereafter, the manufactured mesh sheet is drawn on a hemispherical plate to manufacture a hemispherical mesh filter, and the hemispherical mesh filter is assembled with a gasket to manufacture an EM filter.

Since the EM filter manufactured by the above method has a three-dimensional twill weave structure and a regular weaving pattern, its effective space area is large, thus it is easy to discharge carbon, soot, and foreign materials, thereby preventing the filter from being clogged.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A filter for an EGR (exhaust gas recirculation) cooler, comprising:
    a gasket; and
    a mesh filter including a horizontal wire and a vertical wire that are metal wires,
    wherein the horizontal wire and the vertical wire form a twill weave structure;
    wherein a ratio of a wire diameter of the horizontal wire with respect to a wire diameter of the vertical wire is greater than 1 and less than or equal to 1.3;
    wherein the twill weave structure includes pores formed by the intersecting of the horizontal wire and the vertical wire;
    wherein sizes and shapes of the pores are substantially the same; and
    wherein each of the pores is square and a length of one side of each of the pores is 130 μm to 200 μM.

2. The filter for the EGR cooler of claim 1, wherein each of the metal wires is a SUS wire.

3. The filter for the EGR cooler of claim 1, wherein the horizontal wire passes through two or more vertical wires and then intersects a next vertical wire.

4. The filter for the EGR cooler of claim 1, wherein, in the twill weave structure, horizontal wires adjacent to each other respectively intersect different vertical wires.

5. The filter for the EGR cooler of claim 1, wherein the ratio of wire diameters of the horizontal wire and the vertical wire is 1.1:1 to 1.2:1.

6. The filter for the EGR cooler of claim 1, wherein the wire diameter of the horizontal wire is 100 μm to 150 μm.

7. The filter for the EGR cooler of claim 5, wherein the wire diameter of the horizontal wire is 100 μm to 150 μm.

8. The filter for the EGR cooler of claim 5, wherein each of the metal wires is a SUS wire.

9. The filter for the EGR cooler of claim 6, wherein the ratio of wire diameters of the horizontal wire and the vertical wire is 1.1:1 to 1.2:1.

10. A manufacturing method of a filter for an EGR (exhaust gas recirculation) cooler, the method comprising:
    preparing horizontal and vertical wires that are metal wires;
    manufacturing a mesh sheet by twill-weaving the horizontal and vertical wires, wherein the mesh sheet includes pores formed by the intersecting of the horizontal and vertical wires, sizes and shapes of the pores are substantially the same so that each of the pores is square and a length of one side of each of the pores is 130 μm to 200 μm and wherein a ratio of a wire diameter of a respective horizontal wire with respect to a wire diameter of a respective vertical wire is greater than 1 and less than or equal to 1.3;
    manufacturing a hemispherical mesh filter by drawing the manufactured mesh sheet on a hemispherical plate; and
    assembling the manufactured hemispherical mesh filter with a gasket.

11. The method of claim 10, further comprising heat-treating the horizontal and vertical wires before the twill-weaving of the horizontal and vertical wires.

12. The method of claim 10, wherein each of the metal wires is a SUS wire.

13. The method of claim 10, wherein a horizontal wire of the horizontal and vertical wires passes through two or more vertical wires, and then intersects a next vertical wire.

14. The method of claim 10, wherein in the mesh sheet, horizontal wires adjacent to each other respectively intersect different vertical wires.

15. The method of claim 10, wherein a ratio of diameters of the horizontal and vertical wires is 1.1:1 to 1.2:1.

16. The method of claim 10, wherein a diameter of the horizontal wire is wo μm to 150 μm.

17. A filter for an EGR (exhaust gas recirculation) cooler, comprising:
    a gasket; and
    a mesh filter including a horizontal wire and a vertical wire that are metal wires, wherein each of the metal wires is a SUS wire,
    wherein the horizontal wire and the vertical wire form a twill weave structure;
    wherein a ratio of a wire diameter of the horizontal wire with respect to a wire diameter of the vertical wire is 1.1:1 to 1.2:1;
    wherein the twill weave structure includes pores formed by the intersecting of the horizontal wire and the vertical wire;
    wherein sizes and shapes of the pores are substantially the same; and
    wherein each of the pores is square and a length of one side of each of the pores is 130 μm to 200 μm.

18. The filter for the EGR cooler of claim 17, wherein the horizontal wire passes through two or more vertical wires and then intersects a next vertical wire.

19. The filter for the EGR cooler of claim 17, wherein, in the twill weave structure, horizontal wires adjacent to each other respectively intersect different vertical wires.

20. The filter for the EGR cooler of claim 17, wherein the wire diameter of the horizontal wire is 100 μm to 150 μm.

* * * * *

UNITED STATES PATENT AND TRADEMARK OFFICE
CERTIFICATE OF CORRECTION

| | | |
|---|---|---|
| PATENT NO. | : 11,779,868 B2 | Page 1 of 1 |
| APPLICATION NO. | : 17/071465 | |
| DATED | : October 10, 2023 | |
| INVENTOR(S) | : Jongcheon Kim | |

It is certified that error appears in the above-identified patent and that said Letters Patent is hereby corrected as shown below:

In the Claims

Column 5, Claim 1, Line 59; delete "200 µM" and insert --200 µm--

Column 6, Claim 16, Line 46; delete "wo µm to 150 µm" and insert --100 µm to 150 µm--

Signed and Sealed this
Fourteenth Day of November, 2023

Katherine Kelly Vidal
*Director of the United States Patent and Trademark Office*